United States Patent [19]

Dunn

[11] 3,715,423

[45] Feb. 6, 1973

[54] PLASTIC ENCAPSULATION OF SEMICONDUCTOR DEVICES

[75] Inventor: Thomas A. Dunn, Mesa, Ariz.

[73] Assignee: Motorola, Inc., Franklin Park, Ill.

[22] Filed: Jan. 25, 1971

[21] Appl. No.: 109,602

Related U.S. Application Data

[63] Continuation of Ser. No. 761,074, Sept. 20, 1968, abandoned.

[52] U.S. Cl. ..................264/250, 264/263, 264/272, 264/276

[51] Int. Cl. ..............................................B29d 3/00

[58] Field of Search.......264/276, 263, 272, 275, 250

[56] References Cited

UNITED STATES PATENTS

| | | | |
|---|---|---|---|
| 3,423,516 | 1/1969 | Segerson | 264/272 X |
| 3,081,497 | 3/1963 | Scherry | 264/276 |
| 3,381,736 | 5/1968 | Ford et al. | 264/275 X |
| 3,484,516 | 12/1969 | Simons | 264/275 X |
| 2,800,731 | 7/1957 | Carson | 264/263 X |
| 2,937,409 | 5/1960 | Cole | 263/276 |
| 3,238,287 | 3/1966 | Chapman | 264/276 |

*Primary Examiner*—Robert F. White
*Assistant Examiner*—Allen M. Sokal
*Attorney*—Mueller, Aichele & Gillman

[57] ABSTRACT

A first plastic encapsulated subassembly has a cup-shaped recess with the sides of the cup having a taper of about 30° and a heat sink opposite the cup. The assembly is placed in a cavity of a mold with a second heat sink in contact with the subassembly heat sink and resting on one face of the mold cavity. A mold pin is inserted into the cup-shaped recess, forcing the subassembly, using a precalculated and controlled deformation of the cup, heat sink and the one mold face together such that the later injected plastic encapsulating material does not flow therebetween to provide a good thermal path from the subassembly heat sink to an outer face of the completed plastic encapsulated assembly.

3 Claims, 5 Drawing Figures

INVENTOR.
THOMAS A. DUNN
BY
Mueller, Aichele & Rauner
ATTORNEYS

PLASTIC ENCAPSULATION OF SEMICONDUCTOR DEVICES

The subject application is a continuation of application Ser. No. 761,074 filed Sept. 20, 1968, in the name of the same inventor, titled Plastic Encapsulation of Semiconductor Devices, now abandoned.

BACKGROUND OF THE INVENTION

The present invention relates to electrical devices, and particularly to the method and apparatus for the fabrication of electrical devices having plural plastic encapsulated assemblies, one within the other, with a continuous thermal and electrical path from an innermost plastic encapsulated assembly to an outer surface of the complete assembly.

Plastic encapsulation of electrical devices, especially semiconductor devices, by transfer and injection molding has become important because of low cost considerations, high speed assembly operations, and smaller volumetric devices. Such devices are encapsulated in transfer or injection molds, for example, wherein the plastic encapsulating material is introduced as a fluid and then solidified around the device. Because of the pressures involved, such fluid plastic encapsulating material has a tendency to run or creep between adjacent parts of the assembly being molded. In large plastic encapsulated assemblies, there may be heat producing devices deep within the assembly. It is important that such generated heat be dissipated. Unfortunately, most plastic encapsulating materials are poor thermal conductors. Therefore, it is desired to provide a thermal path from an innermost plastic encapsulate device to the outer surface of the total assembly. To facilitate handling, it is desired to plastic encapsulate certain subassemblies to be encapsulated with other subassemblies or units. Therefore, there must be provided means of making contact with plural heat sinks without interposition of plastic encapsulating material therebetween. Also, in so doing, the pressure on the subassembly should not be sufficient to alter the electrical characteristics of the active components therein or cause other damage to the subassembly.

It is desired therefore to provide pressure on a subassembly such that a heat sink can be forced against the face of a mold cavity such that no plastic encapsulating material flows therebetween. A spring could be used; however, this has a disadvantage in the high maintenance cost of the molding machine. That is, springs have a tendency to weaken with time. If a fixed pin was to engage the heat sink, close tolerances would be required to ensure not damaging the heat sink while ensuring that the mold was always closed.

SUMMARY OF THE INVENTION

It is an object of the present invention to provide a method and apparatus for facilitating the plastic encapsulation of plastic encapsulated subassemblies having a continuous thermal path from a subassembly to be molded inside an ultimate package to outside the ultimate package.

A feature of the present invention is the provision of a cup-shaped recess on a subassembly opposite a heat sink wherein the cup has tapered sides to provide yieldability to a mold pin used to force the subassembly toward one face of a mold cavity.

Another feature is the provision of a mold pin having a tapered edge for increasing the yieldability of the plastic encapsulated subassembly to pressure imposed thereon by the mold pin.

Another feature of the invention is the provision of a plastic encapsulated assembly having at least one plastic encapsulated subassembly with a continuous thermal path from the subassembly to outside the assembly.

THE DRAWING

Figure 1:
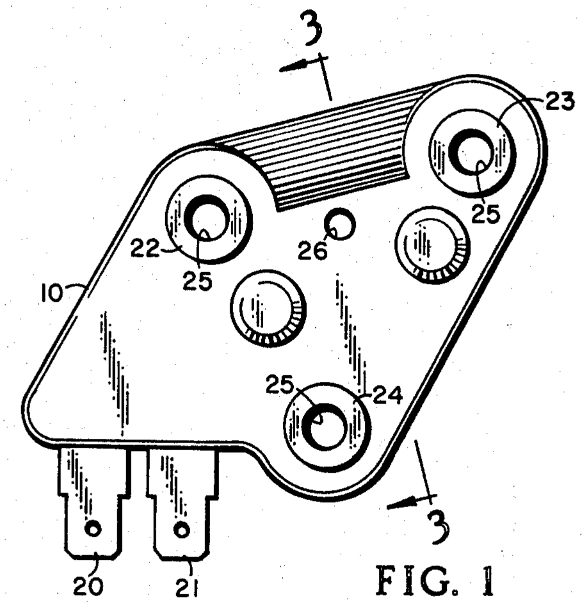
FIG. 1 is a plan view of a plastic encapsulated assembly incorporating the teachings of and made with the method of the present invention.
Figure 2:
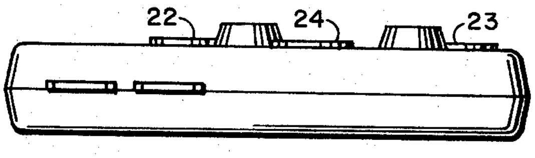
FIG. 2 is an elevational view of the FIG. 1 assembly.
Figure 3:
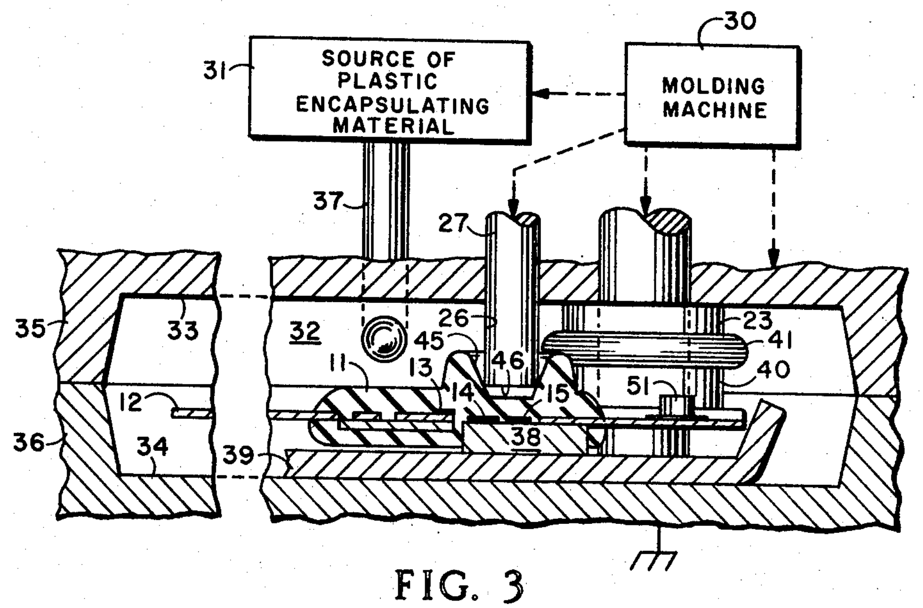

FIG. 3 is an enlarged partial sectional view of an assembly without the outer plastic encapsulating material in a mold cavity with the sectional view of the assembly taken in the direction of the arrows along line 3—3 in FIG. 1 and shows in cross section the engagement of a mold pin engaging a plastic encapsulated subassembly for preventing creepage of plastic encapsulating material between adjacent heat sinks.

Figure 4:
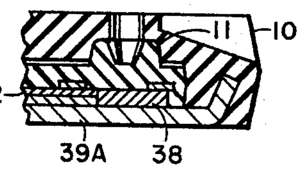

FIG. 4 is a partial sectional view of a completed plastic encapsulated assembly taken in the direction of the arrows along line 3—3 of FIG. 1.

Figure 5:
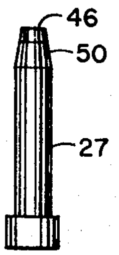

FIG. 5 is an elevational view of a mold pin usable in practicing the method of the present invention.

DETAILED DESCRIPTION OF THE ILLUSTRATIVE EMBODIMENT

Referring more particularly now to the drawing, like numbers indicate like parts and structural features in the various views. The assembly includes the outer coating of plastic encapsulated material 10 covering a plastic encapsulated subassembly 11. Subassembly 11 includes plastic encapsulated material firmly holding a lead frame 12 which extends from within the subassembly outwardly and provides electrical connections to active semiconductor devices 13, 14 and 15 within the subassembly. Lead frame 12 may make electrical connections to other units outside subassembly 11 but contained within plastic encapsulating material 10. Outwardly extending pins 20 and 21 provide two electrical connections for the electrical units within plastic encapsulating material 10 to outside. Further, the annular contact areas 22, 23, and 24 provide additional electrical connections to the interior components. Apertures 25 provide three mounting holes for the assembly. The arrangement is such that conductive bolts extending through the respective apertures 25 are electrically insulated from the components inside except for the electrical connections afforded through the annular contact portions 22, 23 and 24. Insulating washers may be interposed between such mounting bolts (not shown) and the annular contact areas as desired. The plastic encapsulated material, of course, is electrically insulating as well as being thermally insulating. Another aperture 26 is formed by a mold pin 27 used to force subassembly 11 against a mold cavity face as explained with respect to FIG. 3.

Referring to FIG. 3, the process of fabrication is described, as it will give a clear understanding of the structural features of the ultimate assembly. A molding machine 30 of usual design has a source 31 of plastic encapsulating material in communicative relationship to a mold cavity 32 formed between opposed faces 33 and 34 of a pair of closed mold dies 35 and 36. The communicative relationship provided by the usual mold runners in molding machines is diagrammatically illustrated by the cylindrical run 37. The operation starts with the mold dies 35 and 36 parted. The plastic encapsulated subassembly 11 secured about the lead frame 12 and having a conductive heat sink 38 is placed upon a larger heat sink member 39. Heat sink member 39 may be an anodized aluminum member to provide electrical insulation or may be bore aluminum if electrical insulation is not desired. Components other than the subassembly 11 may be mounted directly on heat sink member 39 to provide good thermal communication therewith such as by adhesive bonding. A layer of adhesive forms a small thermal insulation layer and for the particular subassembly 11 it is desired not to have any form of heat insulative properties in a thermal path extending from subassembly 11 through the heat sink 38 thence heat sink member 39 outside the ultimate package as at face 39A of member 39 enclosed by plastic encapsulating material 10. The annular contact areas 22, 23 and 24 are the upper surfaces of three upstanding tubular cans 40 each having a radially outwardly extending bulge 41 for facilitating reducing the height of the can to the exact distance between the opposed die faces 33 and 34.

Heat sink 38 in subassembly 11 has a relatively large surface area to dissipate a goodly amount of heat. In plastic encapsulating items having large facing surfaces such as members 38 and 39, it is quite easy for the plastic encapsulating material which is introduced through conduit 37 into mold cavity 32 to flow or creep between the members 38 and 39 thereby breaking the thermal path. To obviate this creepage, the subassembly 11 is pressed firmly against member 39 which in turn is pressed against the one mold face 34 by the mold pin 27 extending into the mold cavity 32 and engaging subassembly 11 opposite heat sink 38. Subassembly 11 has an outwardly facing truncated-conical cup-shaped recess 45 for receiving mold pin 27. In one embodiment of the invention, the truncated sides of recess 45 have an angle of 30° from the vertical as seen in FIG. 3. As mold pin 27 descends and engages subassembly 11, its downward edge 46 engages the sloping sides in an interference type engagement. Mold pin 27 scrapes and digs into the yieldable plastic material forming the recess 45 to produce a consistent downward force on subassembly 11, heat sink 38 and member 39 against the one face 34 of die part 36. If mold pin 27 were to enter mold cavity 32 an extended distance, the tapered side of recess 45 permits scraping of the plastic material away as permitting pin 27 to descend a greater distance without breaking the plastic encapsulation or otherwise providing strains on the semiconductor devices 13, 14 and 15 inside subassembly 11.

It was found that tapering the lower end of mold pin 27, as at 50 provided a better scraping of the recess sides to permit a further extension without damage to the subassembly. For example, a 2° taper was found sufficient to provide improved operations.

It is understood that a plurality of subassemblies may be so plastic encapsulated and then further plastic encapsulated in larger assemblies. For example, assembly encapsulated by material 10 may be further plastic encapsulated in a yet larger assembly wherein a mold pin 27 engages the same recessed cup 45 in subassembly 11 to press the member 39 against another heat sink member which is to be exposed to the outer surface of the ultimate assembly. Also, it is understood that a plurality of the subassemblies 11 may be included in any ultimate assembly. The plural stages of plastic encapsulation permits testing of various plastic encapsulated subassemblies prior to being enclosed in a larger assembly. Such testing assures satisfactory subassemblies before additional assembly time is used.

Devices in addition to the subassembly 11, such as device 51, may be mounted on lead frame 12 or directly on heat sink 39. Suitable electrical connections are made between all units in the assembly to various portions of the lead frame. Also subassembly 11 may have its heat sink 38 disposed directly on mold face 34 to provide a short thermal path to outside the ultimate package. Member 39 is made larger than heat sink 38 such that it provides a thermal path for a plurality of units within the ultimate package.

What is claimed is:

1. A method for the plastic encapsulation in a mold cavity of an electrical unit including at least one sub-assembly containing a semiconductor element comprising the following steps:
   a. encapsulating in plastic a sub-assembly containing a semiconductor element to provide an exposed metal surface,
   b. forming a conical recess in the plastic portion of said sub-assembly opposite to said exposed metal surface,
   c. placing a metal member inside the mold cavity,
   d. placing the encapsulated sub-assembly into the mold cavity and orienting said sub-assembly so that said metal member is interposed between the metal surface of said sub-assembly and an inner wall of the mold cavity,
   e. closing the mold cavity,
   f. inserting a mold pin into said cavity to enter said conical recess of the encapsulated sub-assembly, said plastic portion being located on an opposing surface of the sub-assembly with respect to the exposed metal surface thereof,
   g. applying a force to said mold pin sufficient to deform the sides of said recess without breaking said subassembly and urge the combination of said exposed metal surface, said metal member and the adjacent wall of said mold cavity into sealing engagement,
   h. inserting plastic encapsulating material into said mold cavity while maintaining the force on said mold pin, and then
   i. removing the plastic encapsulated electrical unit from the mold cavity, said encapsulated unit having an external metal member in contact with said exposed metal surface of the sub-assembly contained therein.

2. The method in accordance with claim 1 wherein said deforming of the sides of said conical recess is the scraping thereof.

3. The method in accordance with claim 1 wherein said deforming is the application of a controlled force.

* * * * *